(No Model.)
F. EARL.
EGG BEATER.
No. 280,019. Patented June 26, 1883.
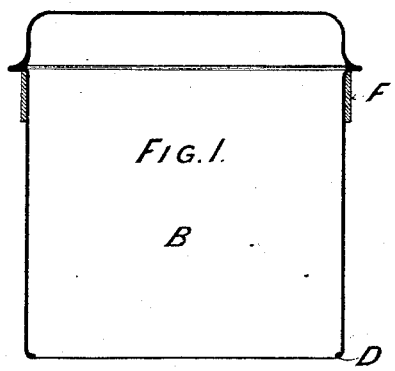
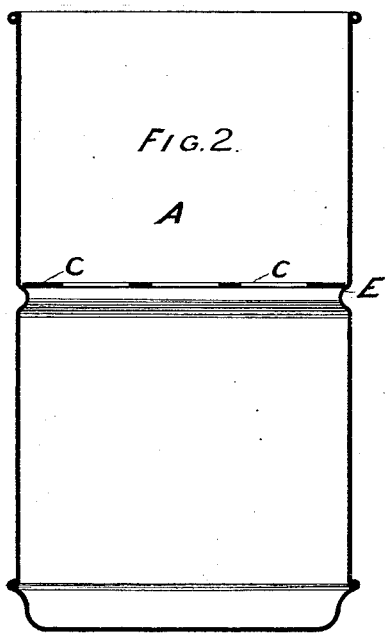
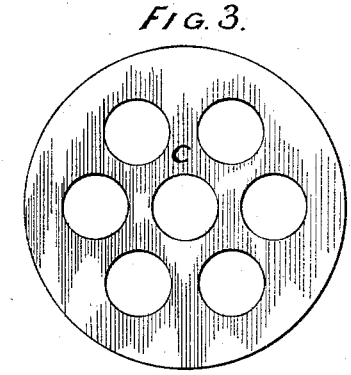
Witnesses.
Inventor.

UNITED STATES PATENT OFFICE.

FRANCIS EARL, OF ST. IVES, COUNTY OF HUNTINGDON, ENGLAND.

EGG-BEATER.

SPECIFICATION forming part of Letters Patent No. 280,019, dated June 26, 1883.

Application filed May 2, 1883. (No model.)

*To all whom it may concern:*

Be it known that I, FRANCIS EARL, of St. Ives, county of Huntingdon, England, have invented a new and useful Improved Egg-Beater, of which the following is a specification.

The improvements relate to receptacles for holding and beating up therein the yolks and whites of eggs, for which purpose I use a cylindrical receptacle of metal or porcelain of convenient size. I close one end, and about half-way up the cylindrical receptacle I form or make a circular projection, ring, or ledge for holding a loose metal or porcelain diaphragm furnished with holes. I also make a hollow cylindrical lid with a closed top and a shoulder or ring on its lowest edge, and sometimes a shoulder, ring, or rim at or near its upper edge, the latter being fitted with a rubber ring; or I use a rubber ring without any shoulder. This cylindrical lid is intended to be placed within the cylindrical receptacle and to project downward therein, so as to hold the loose metal diaphragm in position, which it does by means of its shoulder or rim, so that the diaphragm is held between it and the projection in the receptacle. The rubber ring secures the lid in the receptacle at top and prevents leakage.

The drawings attached will show how the invention can be performed.

Figure 1 is a sectional elevation of lid, and Fig. 2 a sectional elevation of beater; Fig. 3, a plan of diaphragm.

In all the figures like letters represent like parts.

A is the receptacle; B, the hollow lid; C, the perforated loose diaphragm. D is turned-up lip or rim, which presses on C when placed on rim E in A, and so secures C. F is a rubber band, which, fitting into the upper portion of A, causes the lid B to be held securely. I prefer to make A and B of block-tin and C of pewter.

The beater is used as follows: An egg is broken and contents poured into the receptacle. The loose perforated diaphragm is then inserted over the contents, and the hollow lid is then placed in the cylinder, and so holds the diaphragm in place. The whole apparatus is then shaken briskly for a few seconds and contents will be found thoroughly whisked.

I claim—

The improved egg-beater constructed substantially as described and illustrated.

In testimony whereof I have signed this specification in the presence of two subscribing witnesses.

FRANCIS EARL.

Witnesses:
H. I. HADDAN,
Y. A. RAE.